(12) United States Patent
Barber

(10) Patent No.: US 6,502,193 B1
(45) Date of Patent: Dec. 31, 2002

(54) SOFTWARE ACCESS

(75) Inventor: Philip J. Barber, Welshpool (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/281,432

(22) Filed: Mar. 30, 1999

(30) Foreign Application Priority Data

Mar. 31, 1998 (GB) ................................................ 9806918

(51) Int. Cl.[7] ........................ G06F 15/16; G06F 15/177
(52) U.S. Cl. ........................ 713/201; 713/200; 713/182; 713/183; 713/151; 713/185; 709/100; 709/104; 709/220; 709/328
(58) Field of Search ................................ 713/200, 201, 713/182, 183, 184, 151, 152, 185; 709/100, 104, 220, 246, 316, 228, 328

(56) References Cited

U.S. PATENT DOCUMENTS 5,974,453 A * 10/1999 Andersen et al. ........... 709/220
6,038,625 A * 3/2000 Ogino et al. ................ 709/328

* cited by examiner

Primary Examiner—Ly V. Hua
(74) Attorney, Agent, or Firm—Nixon & Vanderhye PC

(57) ABSTRACT

A networked computer system is disclosed comprising database (or other) 5 applications accessible over a network to users via terminals in which at least some users have restricted access (restricted access privileges) to the applications. A security system is incorporated in the network and provides a functional layer between the user's environment and the database (or other) applications environment. The security system insulates the user's environment from the environment of applications being accessed so that connection information is not available to the user in a form that would permit the circumvention of access privileges.

12 Claims, 4 Drawing Sheets

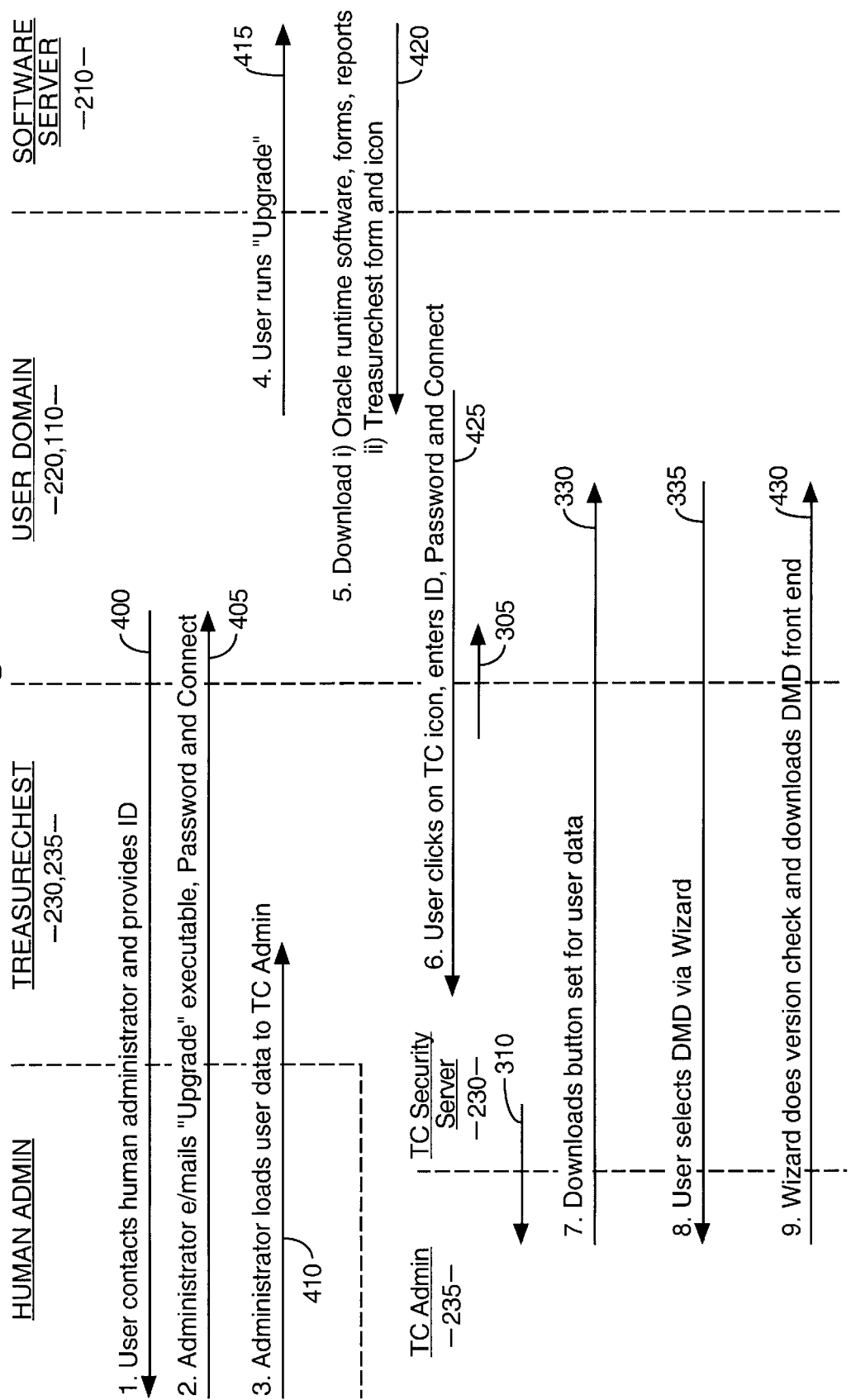

SOFTWARE ACCESS

FIELD OF THE INVENTION

The present invention relates to providing controlled access to data and/or software processes in a distributed environment. It finds particular application in database security.

BACKGROUND OF THE INVENTION

In the past, users have been able to run software applications from their terminals, for instance by accessing the application software on an applications server. The application itself may be downloaded to the user terminal, or just a suitable front end for the application may be downloaded, such as forms and selection buttons, the application remaining on the remote server. An application accessed by a user may then give the user access to other software processes, or to data stored in a database.

In a distributed environment, the application or database may be installed on a site remote to the user, across one or more networks. To run the application or access the database, the user needs routing (or "connect") information of some sort, such as a network address. If the user wants to access a database directly, they need connect information for the database. If the user wants to run an application and the application is simply a front end to a database, the connect information the user needs is effectively, again, connect information for the database itself. Where the user can get connect information to a database, there is a potential weakness in access control.

Access control arises where there is a requirement for access restrictions to an application or database, for instance such that it can be used by subscribers only. Alternatively, it may be that some users can use all the functionality available while other users are barred from some functionality, for instance because of rank or job description. This situation would arise where account staff need both read and write access to a company's accounts databases but staff elsewhere in the company might be limited to read access only, and to accessing data relating only to themselves.

(A user's terminal will usually these days be a personal computer. However, it could equally have little or no processing capacity of its own, instead having access to processing capacity elsewhere. The use of the word "terminal" herein should not be taken as an indication of the capabilities of the user equipment. It is simply used to refer to the piece of equipment the user has access to for making inputs.)

In order to provide a security check, it is known to write an authentication process into an application, or database front end, so that it will only run when a valid identity code (ID) and a password have been entered by the user. The application or front end may also have for instance a stored set of "user profiles" which allow it to tailor the capabilities it offers to a user to a limited set of capabilities for which the user is specifically registered.

As mentioned above, a problem can occur where a user can get connect information for a database, such as a network address. The user might have the connect information legitimately, because they have at least limited rights to access the database directly. Alternatively, the user might have legitimate rights to run an application within their own environment which gives access to a remote database and the application may store the network address for the database within the user's environment. A technically expert user may then be able to extract the connect information for the database for instance because they know where in their environment the connect information is stored.

However the user gets connect information to a database, the problem is that the user can then potentially bypass the application or front end which would normally restrict the data they can view in the database. For instance, the user could access the database using a different application, or tool, particularly one which does not restrict that user. All the user has to do is give the substitute application or tool the connect information for the database.

SUMMARY OF THE INVENTION

According to embodiments of the present invention, there is provided a security system for controlling access to data and/or one or more software processes, which security system comprises:

i) input means for receiving user identification data from a user station;

ii) means for authenticating received user identification data;

iii) first data storage means for storing access restriction information in relation to the data and/or software process(es);

iv) second data storage means for storing connect information for the data and/or software process(es);

v) input means for receiving an identifier for selected data or software process(es);

vi) translation means for translating a received identifier to connect information for locating the selected data or software process(es), using the second data storage means;

vii) connection setup means for setting up a connection for providing access from the user station to the selected data or software process(es), using a translated identifier; and viii) disconnect means for disconnecting a link between the security system and the user station once said connection has been set up between the user station and the selected data or software process(es).

The term "user station" as used herein comprises the user's local environment; that is at least the user's terminal and potentially also the user's local server. In general, the user station will comprise a platform on which the user's local processes run. This could be for instance a personal computer alone, or a dumb terminal plus other platforms, potentially network-based.

Preferably, the connection setup means comprises means for transmitting connect information (a translated identifier) via the user station to the selected database or software process. Preferably also, the connection setup means comprises encryption means for encrypting the connect information prior to transmission.

A security system according to an embodiment of the present invention constitutes a functional layer between a user station and one or more databases and/or software processes, such as a set of applications. If connect information for the database(s) and/or process(es) is stored at the security system and need only be transmitted through the user station, at runtime, for the purpose of finding a selected database and/or software process, the user cannot get at the connect information except via the security system. Without the connect information, the user cannot simply substitute unrestricted tools for a restricted software application and so gain access to data for which they are not authorised and the security system will block the user from getting the connect information.

In particular, the connect information for a selected database or software process never has to be stored at the user station, even to establish connection to it. This significantly improves security against hacking.

Although the connection information is transmitted through the user station in setting up the connection, it is preferably transmitted in encrypted form.

Once the user station is connected to a selected database or process, the security system can drop out, using the disconnect means, and thus be available. Preferably, the security system will accept a fresh input from a user station which has already established connection to a database or process using the security system. It is possible then for one user station to run multiple applications concurrently, for instance potentially displaying the results of running different tools with the same set of data in different windows on screen, simultaneously.

Preferably, the security system comprises at least two parts, each part being provided with authentication means, a first of said two parts comprising i) and ii) above and further comprising:

ix) substitute login means to disconnect a connection between the first part and a user station and to trigger reconnection of the user station to the second of said two parts; and x) data storage for identification data for use by the authentication means of the second part, wherein the substitute login means has access to the data storage for identification data and is arranged to supply identification data from that data storage for use in said reconnection.

The substitute login means provides an additional defence to hacking since the user never has knowledge of the identification data, for instance ID and password, which has given them access to the second part of the security system. Preferably, it is the second of the two parts which comprises iii) to vii) above. Hence the user can only get access to the selected database or software process via the second part of the security system and they never have knowledge of the identification data for that second part.

Preferably, the security system further comprises an access information store and means for outputting to a user station at least one encrypted data file, said encrypted data file comprising access information in respect of a selected database or software process. The access information contained in an encrypted data file may be determined at least in part by the user identification data received at the input means. This allows a selected database or software process to read the access rights relevant to a user at runtime, at the user station, without the security system having to remain involved. It also enhances security as discussed below.

It is known for a user to have a user profile for a database or software process. The user profile is allocated to the user and holds access information (defines the access rights) for that user in respect of a database or software process. User profiles might be stored with the database or software process and the user identification data, which the individual user knew and entered, is used by the database or software process to select and apply the relevant user profile. This suffers from the problem that there has to be a profile for every user. This can take up significant storage space.

In embodiments of the present invention, the access information store holds identifiers for data sets, or selections of functionality. It does not hold user profiles. When a user first enters an ID and password, the substitute login means can substitute, unknown to the user, effectively an identifier for a data set or selection of functionality which is then sent as the encrypted data file to the user station. Several users may share access rights to the same data set or selection of functionality and a representation of those access rights need only be stored once for all such users.

Preferably, selectable databases and software processes reside on platform equipment separate from that of the security system and the security system comprises the means to log the user on with respect to a selected software process by substituting a third set of identification data which is transmitted via the user terminal to the platform equipment but which is never stored at the user terminal. Preferably this third set is encrypted prior to transmission. The use of a third set of identification data, both unknown to the user and never stored at the user station, provides further security.

BRIEF DESCRIPTION OF THE DRAWINGS

A security system given the pseudonym "Treasure Chest" will now be described as an embodiment of the present invention, by way of example only, and with reference to the accompanying figures in which:

FIG. 4 shows a schematic flow diagram of the steps involved in installation of Treasure Chest for a new user.

DETAILED DESCRIPTION OF THE INVENTION

Figure 1:
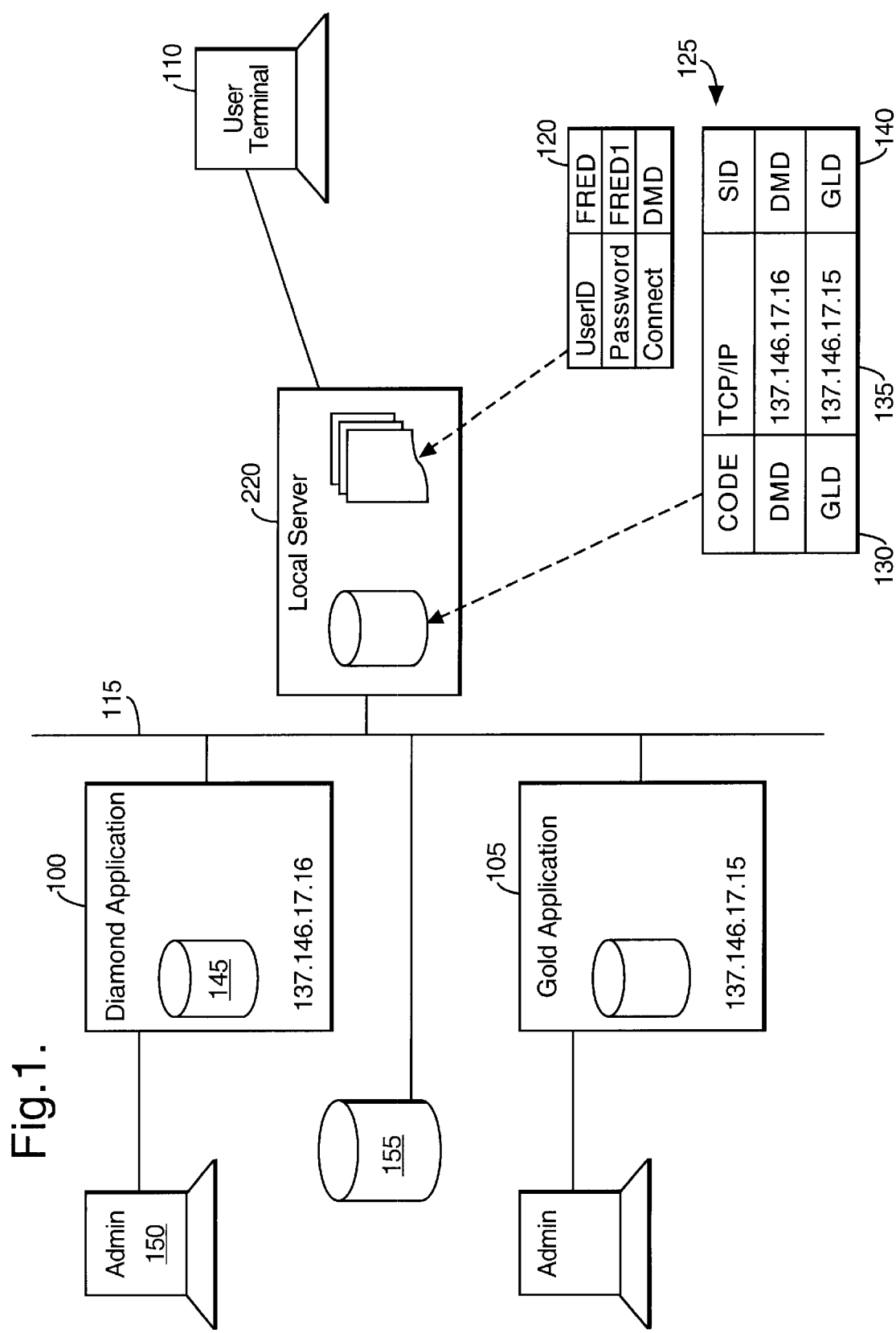
FIG. 1 shows a prior art security system for providing access to one or more applications.

Referring to FIG. 1, in known systems, a user might have access to a selection of applications 100, 105. The user has access via a terminal 110, which might be a personal computer but which might have more or less processing capacity. The terminal 110 has to provide the user with an interface, and therefore probably with display means and an input such as a keyboard, but the intelligence accessed by means of the terminal 110 may reside either at the terminal itself or could reside elsewhere in a distributed system. Such arrangements are familiar to a person skilled in distributed software environments.

The terminal 110 is connected to a network 115 for the purpose of accessing the applications 100, 105. The network could be any suitable network, for instance the Internet or a Local Area Network (LAN). Each application 100, 105 may give access to a database 145, or perhaps to a selection of databases.

When a user wants to access an application 100, 105, a front end for that application has to be made available at the user terminal 110. For instance, this will probably comprise forms for inputting requests with respect to the application, other enabling software for the application, and at least one screen icon, or button, which the user clicks on to gain access to the application. Such a front end will normally be put in place when the user first registers for use of the application.

When the user clicks on the screen icon for gaining access to a selected application, such as the "Diamond" application 100, the terminal 110 will return a form to the user, asking for ID and password. If the application gives access to more than one database, the form may also ask for a database name.

In order to log on the user to the application, the user terminal 110 needs an address for the application in the network 115. To maintain flexibility, the application might simply ask the user for the address. Alternatively, the address could be stored at the user terminal 110, for instance in a table 125 mapping application identifiers 130 to network addresses 135 and server identifiers 140.

In operation, the user will click on the relevant screen icon at the terminal 110 which will pull up a form for ID and password entry for the application. The ID and password data are transmitted to the application itself 100, using the network address given by the user or from the stored table 125. The application runs an authentication process with respect to the ID and password. Once the application 100 has authenticated the ID and password input by the user at their terminal 110, the application will refer to data installed in a database 145 to check the user profile relevant to that ID and password. The user profile informs the application 100 as to what functionality and/or data the user is entitled to access and, within those constraints, the application 100 will then run in response to user inputs at the terminal 110.

Administration of an application 100 as shown in FIG. 1 might be by an administration process 150 dedicated to the application. The administration process 150 provides installation and amendment of user profiles, installation and amendment of user IDs and passwords, and version upgrades for the application.

A problem can arise with such a system, as already mentioned above, where the application 100 is co-located with a restricted access database 155, where the network address for a restricted access database is stored in the user's local environment, or where the user already legitimately has address information for a restricted access database. Once the user has the means to select a database address 135 using an application they are registered to use, it is possible for the user to access the database but to substitute the application, or tool, they use to review the data. Hence, the user might substitute a reports tool which allows them to view the whole of a restricted access database 155, some of which would have been barred to them by the legitimate application 100.

Figure 2:
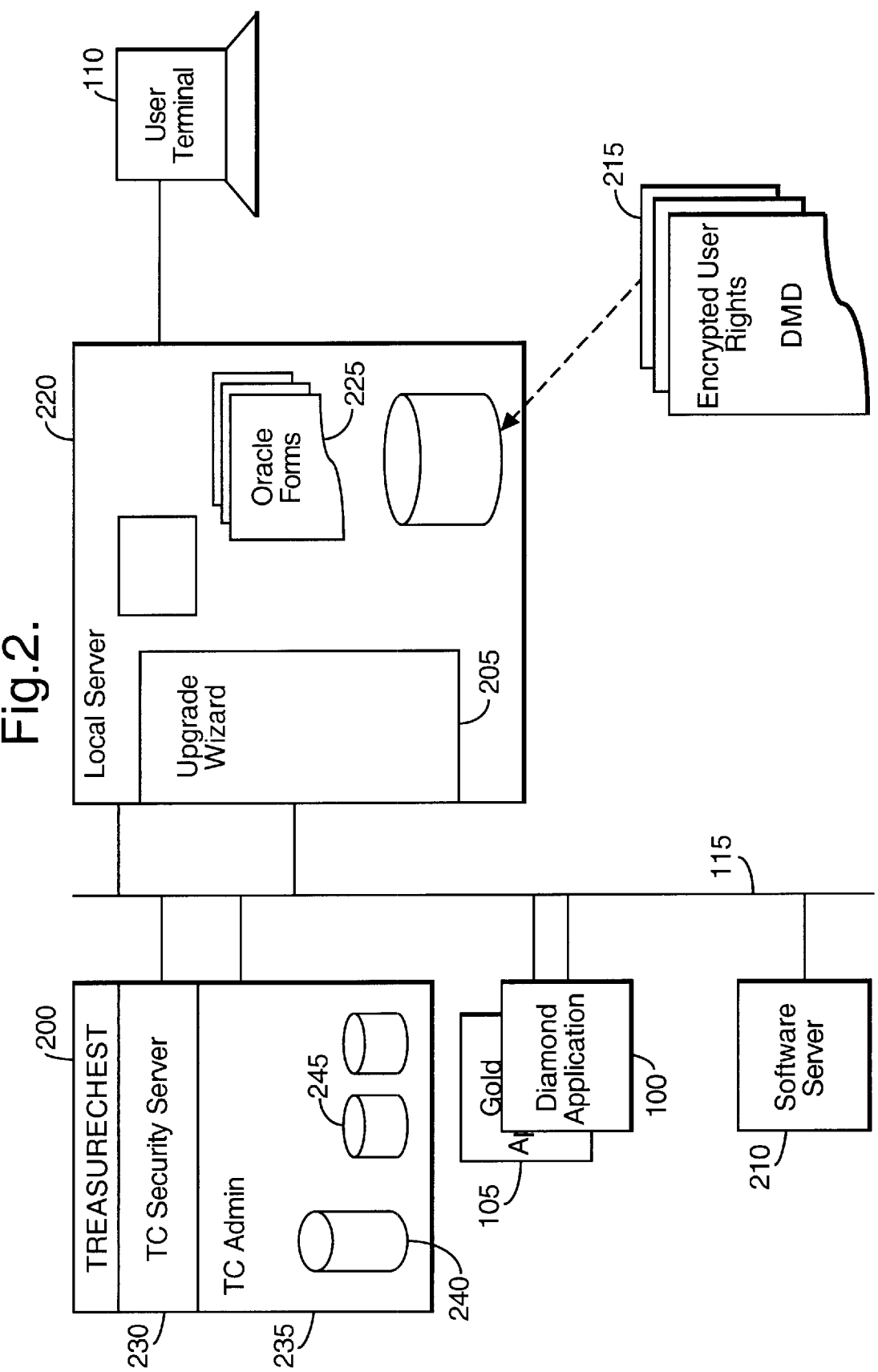
FIG. 2 shows in block diagram the components of Treasure Chest.

Referring to FIG. 2, embodiments of the present invention provide a separate security system 200 through which the user is forced to get access to any of a set of applications 100, 105. The user terminal 110 is also provided with an upgrade wizard 205 for installing necessary functionality at the terminal 110 and for providing version control.

The user terminal 110 in this example provides simply an interface for the user. The intelligence required for running the applications 100, 105 is located at the local server 220 for the user terminal 110. (However, in a different embodiment, the intelligence might be installed at the user terminal 110.)

FIG. 2 shows a Treasure Chest system which is already enabled for the user. The local server 220 is provided with an upgrade wizard 205 for version control with respect to the applications 100, 105 and with a set of forms 225 for use in running Treasure Chest. (As shown, these are Oracle forms but they could equally well be forms for applications generated or supplied by one or more other parties.) The local server 220 has a direct connection to a network 115 as well as via the upgrade wizard 205.

Treasure Chest itself comprises Treasure Chest software, particularly a security server 230 and administration logic 235 loaded at the Treasure Chest site 200 which is connected to the network 115. Because the Treasure Chest site 200 is remote from the local server 220 for the user, the local server 220 needs routing information, or connect information, to communicate with the Treasure Chest site 200. Similarly, applications 100, 105 which the user might wish to use are loaded at sites remotely located across the network 115 with respect to the local server 220 for the user. Lastly, there is a software server 210 for providing the software environment for running the applications 100, 105 which will be needed by the local server 220 in use.

Figure 3:
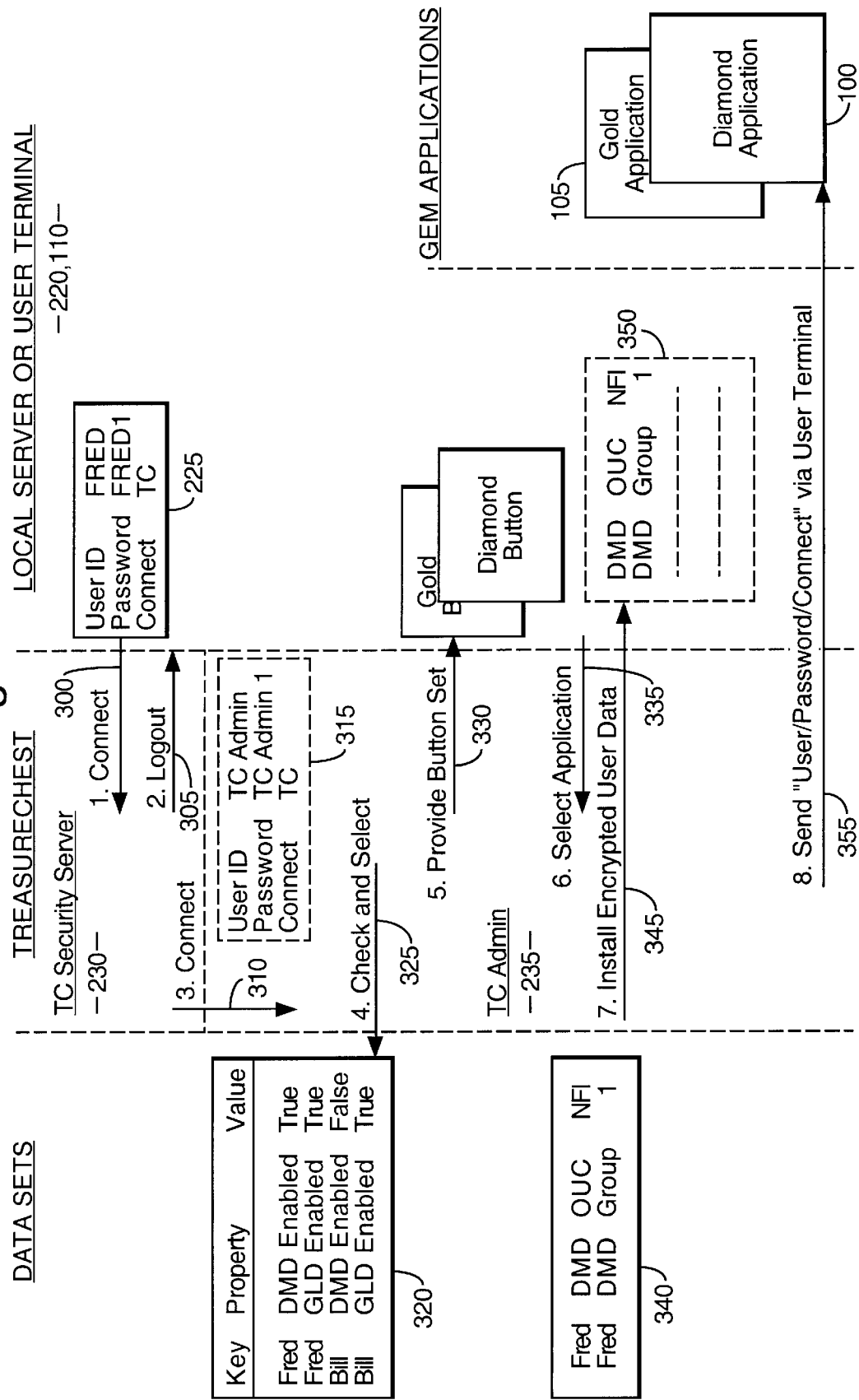
FIG. 3 shows a schematic flow diagram of the steps involved in access to a selected application via Treasure Chest by the user.

Referring to FIG. 3, use of Treasure Chest, when already installed for the user, is as follows. The user is provided with an icon for accessing the Treasure Chest site. The user clicks on the icon (not shown) and the local server 220 returns a form 225 requesting ID and password, together with connect information for the Treasure Chest site 200. The user enters their ID and password, "FRED, FRED 1", and an acronym "TC" for the Treasure Chest site 200. The local server 220 has been provided with a local data store, such as a look up table, which allows it to translate the acronym into connect information for the Treasure Chest site 200. Using this information, the local server 220 outputs the ID and password to the Treasure Chest security server 230 in a "connect" step 300. (Alternatively of course, the user might provide the connect information directly, without use of a local data store.)

The Treasure Chest security server 230 authenticates the ID and password and logs out the local server 220 in a "log out" step 305. The security server 230 now issues a connect instruction 310 which re-connects the local server 220 to the Treasure Chest administration logic 235. In this "re-connection" step 310, the security server 230 substitutes fresh ID and password data 315. This ID and password, shown in FIG. 3 as "TC Admin" and "TC Admin 1" is never transmitted to the local server 220 and is not known to the user at the user terminal 110.

The Treasure Chest administration logic 235 authenticates the ID and password and refers to a data store 240 which provides a table of user rights 320 in a "check and select" step 325. The security server 230 makes the user's original ID "FRED" available to the administration logic 235 and the administration logic uses that ID to search the table of user rights 320 to find out which applications, accessible via Treasure Chest, the user is entitled to use. As shown in FIG. 3, the user with the ID "Fred" is entitled to use the applications Diamond and Gold 100, 105. The user with the ID "Bill", however, is only entitled to use the application Gold 105. The administration logic 235 now returns a set of buttons to the local server 220, for the applications 100, 105 which the user with the ID Fred is entitled to use, in a "Provide Button Set" step 330.

The user selects a button for an application, for instance the Diamond application 100, and the selection is transmitted to the administration logic 235 in a "Select Application" step 335. The administration logic now searches a data store 245 which holds tables showing the access rights the user with the ID Fred has with respect to the Diamond application 100. As shown, a user rights table 340 for the user with the ID Fred shows the user's employee code, the "OUC", as NFI and that the user comes within a group 1. This identifies for the administration logic 235 that the user has rights to certain aspects of the Diamond application and the administration logic 235 encrypts and transmits the user rights data for the user having the ID Fred to the local server 220, in an "installation" step 345. This user rights data 350 will be required by the Diamond application. (The user rights data might be user-specific but might apply to all users in a group, such as "Group 1". Where one set of user rights data can apply to multiple users, the size of the user rights table 340 can potentially be reduced compared to the case where every set of user rights data is allocated to a specific user, as in user profiles.)

At this point, involvement from the Treasure Chest site 200 ceases. The administration logic 235 now issues ID, password and connect information for the selected Diamond application 100. It sends it in encrypted form, via the local server 220. However, it is not stored at the local server 220, merely passing through for the purpose of establishing connection across the network 115 between the local server 220 and the Diamond application 100. This occurs in a "send user/password/connect" step 355.

The user at the user terminal 110 is now able to run the Diamond application 100 via their local server 220 and the Treasure Chest application is released.

Notably, the ID and password received by the Diamond application itself, from the Treasure Chest administration logic 235, are a second substitute ID and password. This adds security since the user, for the second time, has no knowledge of the ID and password giving them access to an application.

Referring to FIG. 4, Treasure Chest needs to be installed and maintained. This involves the "upgrade wizard" 205.

A user who wishes to install Treasure Chest contacts a human Treasure Chest administrator by any means available, such as electronic mail. The administrator assesses the user's access rights in relation to the applications available through Treasure Chest, and also the access rights for that user within each application they are entitled to use. The user tells the human administrator the ID they wish to use. This constitutes a "contact and ID provision" step 400.

The human administrator sends an executable form of the upgrade wizard to the local server 220 for the user, together with a password and connect information for the Treasure Chest security server 230. This is conveniently done by electronic mail, in an "e-mail upgrade loading" step 405.

The human administrator loads the user's access rights data to the TC administration software 235 for the purpose of adding the user to the access rights table 320 and to enable TC administration 235 to construct the user-specific access rights data 340. This is done in a "load user data to TC admin" step 410.

The user now runs the upgrade executable, in a "run upgrade" step 415. The upgrade executable includes connect information for the software server 210 for providing a software environment for running the Treasure Chest software. Further, the executable requests download from the software server 210 of the enabling software for the applications 100, 105, such as runtime software, forms and reports, and download of a Treasure Chest form and icon, in a "download software environment" step 420. The user now has on screen the Treasure Chest icon. By clicking on the icon, the form is called, requesting ID, password and connect data for the Treasure Chest security server 230. The user enters the requested information in a "security server access" step 425.

At this point, the Treasure Chest security server 230 logs out the user terminal 110 or the local server for the user 220 in a repeat of the log out step 305 described above.

The security server 230 now repeats the re-connection step 310 which reconnects the local server 220 to the Treasure Chest administration logic 235. Again, in this reconnection step 310, the security server 230 substitutes fresh ID and password data 315. The Treasure Chest administration logic 235 authenticates the ID and password and refers to the access rights table 320, repeating the "check and select" step 325. The administration logic 235 returns a set of buttons to the user's local server 220 in a repeat of the "provide button set" step 330.

Subsequently, whenever the user selects an application to run, in a "select application" step 335, the upgrade wizard 205 carries out a version check. If the user does not have a front end installed for the application they have selected, or if the version on the user's local server 220 is out of date, the upgrade wizard 205 will install or upgrade the front end for the selected application for that user in a "version check or download" step 430.

By having an upgrade wizard 205 installed at the user's local server 220, the versions of applications run by the user are always the most recent without there having to be administration in place to upgrade all installed software every time a new version of any application issues.

As described above, the user accesses Treasure Chest via a front end to an application. This access may be achieved less directly, for instance via a network such as the Internet and/or an HTML (HyperText Markup Language) interface. The following details extra stages which might be incorporated in an embodiment of the invention to accommodate secure Web (particularly via the Internet using HyperText Transfer Protocol) access using Treasure Chest properties and security.

Installation to support secure Web access comprises the following components:

an Oracle Web server.

a Web instance (Oracle database).

Treasure Chest system as described elsewhere.

Web Login

Users can access standard Web pages serviced by a Web server whereby a login page executes a stored procedure existing in a Web database. The stored procedure has access to the Treasure Chest database by way of a database link. The stored procedure can therefore validate a user's access request using Treasure Chest methods as described above. Having established a valid user access request, a 'cookie' is generated containing the following:

The userid of the user.

The date and time.

The type of access requested (usually Development, Test, Live or Training)

These details are encrypted using a mutating algorithm before being issued as the cookie.

Subsequent access to a secure transaction on the Web results in the following:

1 The cookie is read and decrypted.

2 If a predefined time has elapsed since the cookie was refreshed the user is not accepted and the cookie deleted.

3 If the cookie is valid it is replaced with a new cookie with the current date and time and the transaction is passed as valid.

Procedures can be provided on the Web database to allow host applications to query a user's status without having to understand the detail.

These procedures also provide the host application with the currently enabled type of access (Dev, Test, Live, Training).

Other procedures are available to the user via Web pages to enable them to refresh the cookie without executing a transaction and to display the time before expiry of the current cookie.

Treasure Chest Login

If an Oracle Forms session is running having been started using Treasure Chest and Web access is required, the following mechanism is used so that the user is not required to re-enter the user/password.

Since Treasure Chest has access to the user's id and password it can generate an encrypted string containing login information. This string is passed via the browser command line to the validating procedures on the Web instance. Validation then continues as normal with the issue of a cookie to the user.

The browser is started:

Browser.exe URL Encrypted string

The Web browser starts and connects to the URL (in this case a stored procedure on the Web instance).

The stored procedure is executed with the Encrypted string as input. Following validation the successful validation page is displayed to the user.

What is claimed is:

1. A security system for controlling access from a user station to selected data and/or one or more selected software processes, which security system comprises:
   i) input means for receiving user inputs from the user station, which user inputs comprise at least user identification data and a data identifier for identifying selected data or software process(es);
   ii) means for authenticating said at least user identification data received from said input means;
   iii) data storage means for storing access restriction information for each authorized user, and connect information, in relation to the data and/or software process(es);
   iv) translation means for translating the received data identifier to connect information suitable for locating the selected data or software process(es), using stored connect information in said data storage means after said means for authenticating authenticates the received user identification data or;
   v) connection set up means for setting up a connection for providing access from the user station to the selected data or software process(es) after receiving the translated data identifier as the connect information from said translation means; and
   vi) disconnect means for disconnecting a link between the security system and the user station once said connection has been set up between the user station and the selected data or software process(es).

2. A security system according to claim 1, wherein the connection set up means comprises means for transmitting the connect information via the user station to a selected database and/or software process, for use in setting up said connection.

3. A security system according to claim 2 wherein the system further comprises encryption means for use by the connection set up means in encrypting the connect information prior to transmission.

4. A security system according to claim 1, wherein the system comprises at least two parts, each part having access to said authentication means, a first of said two parts comprising said input means for receiving the user identification data from a user station, the system further comprising:
   vii) substitute login means to disconnect a connection between the first part and a user station and to trigger reconnection of the user station to the second of said two parts; and
   viii) a second data storage means for storing identification data for use by said authentication means
wherein said substitute login means has access to said second data storage means and is arranged to supply the identification data from said second data storage means for use in said reconnection.

5. A security system according to claim 4 wherein the second of said two parts comprises said second data storage means, said translation means, said connection setup means and said disconnect means.

6. A security system according to claim 4 which further comprises an access information store and means for outputting to the user station at least one encrypted data file, said encrypted data file comprising access information in respect of a selected database or software process.

7. A security system according to claim 6 wherein the second of said two parts comprises said access information store.

8. A security system according to claim 6 wherein the access information store holds identifiers for data sets, or selections of software process functionality, and wherein inputs by more than one user, carrying different identification data, may trigger output of the same encrypted data file.

9. A security system according to claim 6, wherein the connection set up means comprises means for establishing new identification data for use in setting up the connection for providing access from the user station to the selected data or software process(es).

10. A security system as in claim 1 which further comprises an access information store and means for outputting to the user station at least one encrypted data file, said encrypted data file comprising access information in respect of a selected database or software process.

11. A security system as in claim 1, wherein the connection set up means comprises means for establishing fresh identification data for use in setting up the connection for providing access from the user station to the selected data or software process(es).

12. A security system according to claim 1 wherein the disconnect means are configured to allow the connection between the user station and the selected data or software process(es) to remain after the link to the user station has been disconnected.

* * * * *